(12) United States Patent
Nomoto et al.

(10) Patent No.: US 8,569,727 B2
(45) Date of Patent: Oct. 29, 2013

(54) LIGHT BEAM SCANNING IMAGE PROJECTION APPARATUS

(75) Inventors: Etsuko Nomoto, Sagamihara (JP); Shigehisa Tanaka, Koganei (JP); Hitoshi Nakamura, Hachioji (JP); Toshiki Sugawara, Kokubunji (JP); Kouji Nakahara, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 358 days.

(21) Appl. No.: 12/999,392

(22) PCT Filed: Jun. 11, 2009

(86) PCT No.: PCT/JP2009/060692
§ 371 (c)(1),
(2), (4) Date: Dec. 16, 2010

(87) PCT Pub. No.: WO2009/154134
PCT Pub. Date: Dec. 23, 2009

(65) Prior Publication Data
US 2011/0096383 A1 Apr. 28, 2011

(30) Foreign Application Priority Data

Jun. 18, 2008 (JP) .................................. 2008-158752

(51) Int. Cl.
*G01V 8/00* (2006.01)
(52) U.S. Cl.
USPC .................................................. 250/559.06
(58) Field of Classification Search
USPC ................ 353/101; 250/235, 236, 559.06
See application file for complete search history.

(56) References Cited

U.S. PATENT DOCUMENTS 5,847,824 A * 12/1998 Ohtomo et al. ............... 356/249
6,424,412 B1 * 7/2002 Matthews ................... 356/152.1

(Continued)

FOREIGN PATENT DOCUMENTS

| JP | 63-309453 A | 12/1988 |
|---|---|---|
| JP | 11-64789 A | 3/1999 |
| JP | 2002-307743 A | 10/2002 |
| WO | WO-2005/083507 A1 | 9/2005 |

OTHER PUBLICATIONS

Office Action issued Nov. 27, 2012, in Japanese Patent Application No. 2010-517882.

*Primary Examiner* — Thanh Luu
*Assistant Examiner* — Renee Naphas
(74) *Attorney, Agent, or Firm* — Miles & Stockbridge P.C.

(57) ABSTRACT

The object of the invention included in the present application is to automatically prevent the deterioration of the image even when the image quality of the projected image is deteriorated due to the replacement of the light source or the like. The following light beam scanning image projection apparatus is one means for achieving the object. In the light beam scanning image projection apparatus including a plurality of light sources which emit the light beams of respectively different wavelengths, a driving section which modulates the intensity of each light beam in accordance with the image signal, the light axis alignment means which aligns the light axes of each light beam, and scanning means which scans the light beams, the light axis alignment means includes: a plurality of optical elements; and an adjusting section which adjusts at least one of a position and a gradient of at least one of the optical elements, and the light beam scanning image projection apparatus further includes: detecting means which detects a shift between a spot center of each light beam and a center reference point; and position correction means which controls the adjusting section based on a detection result in the detecting means to adjust at least one of the position and the gradient of at least one of the optical elements of the light axis alignment means, thereby aligning the light axes of each light beam.

9 Claims, 6 Drawing Sheets

(56) References Cited

U.S. PATENT DOCUMENTS

| | | |
|---|---|---|
| 7,262,765 B2 | 8/2007 | Brown et al. |
| 2003/0010888 A1* | 1/2003 | Shimada et al. ........... 250/201.1 |
| 2004/0114239 A1* | 6/2004 | Sedlmayr ..................... 359/485 |
| 2004/0252281 A1* | 12/2004 | Fischer et al. ................. 353/53 |
| 2007/0120983 A1 | 5/2007 | Yamamoto et al. |

* cited by examiner

LIGHT BEAM SCANNING IMAGE PROJECTION APPARATUS

TECHNICAL FIELD

The present invention relates to a light beam scanning image projection apparatus which performs the light beam scanning to project and display an image on a screen or a three-dimensional space, and more particularly to a correction mechanism in the case where a direction and a spot size of the light beam become unstable depending on the usage environment of the apparatus.

BACKGROUND ART

The image display apparatus used as a monitor of TV and computer at home and in a public space has been increasing in size with the quality improvement of the image to be displayed. On the other hand, with the diversification of the delivery format of the display information, the portability and the low power consumption have been also demanded. In particular, with the development of the infrastructure for the wired and wireless network in the background, the mobile information terminal with a display has become widespread.

As a display capable of displaying a large image with a small device, for example, a projector display has been known (see Patent Document 1 and Patent Document 2 below).

The Patent Document 1 mentioned above discloses a laser display apparatus comprising: three types of laser light sources which emit red, green and blue laser lights; a spatial light modulator by which the laser lights are light-modulated in accordance with an image signal; image forming means which projects an image formed by the light modulation on a screen to form a color image; and an optical lens system.

Furthermore, the Patent Document 2 mentioned above discloses a micro projector in which light beams that have received image signals are reflected by a mirror from light sources of plural wavelengths and the direction of the mirror is scanned to display an image.

Incidentally, the light source does not always emit an ideal beam. For example, in the light source of a single wavelength or plural wavelengths, the light intensity fluctuates with time to produce a noise and the position of the peak wavelength and the spectrum width fluctuate, so that the range of the displayable color varies.

In the disclosure of the Patent Document 2 mentioned above, in order to form the pixel that displays an image while correcting the foregoing fluctuation of the display image, lights of light sources are irradiated to a certain surface, the light obtained by the interaction there is detected, and the optical output of the light sources is controlled while removing the influence of the characteristic fluctuation of the light sources.

Note that the prior art documents relating to the invention of the present application are shown below.

PRIOR ART DOCUMENT

Patent Document

Patent Document 1: Japanese Patent Application Laid-Open Publication No. 11-64789
Patent Document 2: U.S. Pat. No. 7,262,765

DISCLOSURE OF THE INVENTION

Problems to be Solved by the Invention

The Patent Document 1 describes that the light source for the micro projector has the light intensity noise and the wavelength fluctuation, and also due to the temperature change of the light source depending on the usage environment and the initial instability of the operation of MEMS (Micro Electro Mechanical Systems) for scanning a mirror, the light axis and the shape of the light beam reflected by the MEMS are varied in some cases.

Furthermore, it is supposed that one of the lasers of plural wavelengths is broken and replaced when the light source is the semiconductor laser. When one of the light sources is replaced, the light axis after the replacement is shifted from the light axis before the replacement in many cases. At this time, the spots of the three-color light beams of red, green and blue which are to be overlapped at the same point to form one pixel are shifted on the projected screen, and the separation and disturbance of the colors of the image are observed.

The present invention has been made for solving the above-described problems in the conventional technologies, and an object of the present invention is to provide a technology capable of automatically preventing the deterioration of the image even when the quality of the projected image deteriorates due to the change of the usage environment, the time-course change, the replacement of the light source and others in the light beam scanning image projection apparatus.

The above and other objects and novel characteristics of the present invention will be apparent from the description of the present specification and the accompanying drawings.

Means for Solving the Problems

The following is a brief description of an outline of the typical invention disclosed in the present application.

(1) In a light beam scanning image projection apparatus comprising: a plurality of light sources which emit light beams of respectively different wavelengths; a driving section which modulates an intensity of said each light beam in accordance with an image signal; light axis alignment means which aligns light axes of said each light beam; and scanning means which scans said each light beam, the light axis alignment means includes: a plurality of optical elements; and an adjusting section which adjusts at least one of a position and a gradient of at least one of the optical elements, and the light beam scanning image projection apparatus further comprises: detecting means which detects a shift between a spot center of said each light beam and a center reference point; and position correction means which controls the adjusting section based on a detection result in the detecting means to adjust at least one of the position and the gradient of at least one of the optical elements of the light axis alignment means, thereby aligning the light axes of said each light beam.

(2) In the light beam scanning image projection apparatus according to (1), said plurality of light sources include semi-conductor lasers which emit blue, green and red light beams or a solid-state laser which emits a light beam of second high-frequency wave excited by a semiconductor laser.

(3) In the light beam scanning image projection apparatus according to (1), said position correction means adjusts a propagation direction of said each light beam based on the detection result in the detecting means.

(4) In the light beam scanning image projection apparatus according to (1), said light axis alignment means has an optical system which collects the plurality of light beams generated from said each light source at one axis, said optical system includes at least one component of a dielectric film mirror, a dielectric film filter and a lens, and said position correction means controls said adjusting section to change a position and a gradient of at least one component of the dielectric film mirror, the dielectric film filter and the lens of the optical system, thereby adjusting a propagation direction of said each light beam.

(5) In the light beam scanning image projection apparatus according to (1), the detecting means includes: a pinhole; and a plurality of light receiving elements which are disposed around the center reference point and which a light penetrated through the pinhole enters, a reflected light from a projection plane of the light beam emitted from said each light source enters the pinhole, and said position correction means controls said adjusting section based on an output signal from the plurality of light receiving elements to adjust at least one of the position and the gradient of at least one of the optical elements of the light axis alignment means, thereby aligning the light axes of said each light beam.

(6) In the light beam scanning image projection apparatus according to claim (1), the detecting means includes: a pinhole; and a plurality of light receiving elements which are disposed around the center reference point and which a light penetrated through the pinhole enters, a light beam penetrated through a beam splitter out of the light beams emitted from said each light source enters the pinhole, and said position correction means controls said adjusting section based on an output signal from the plurality of light receiving elements to adjust at least one of the position and the gradient of at least one of the optical elements of the light axis alignment means, thereby aligning the light axes of said each light beam.

(7) In the light beam scanning image projection apparatus according to (5) or (6), the position correction means adjusts a beam diameter of said each light beam based on the output signal of the plurality of optical elements.

(8) In the light beam scanning image projection apparatus according to (5) or (6), the light axes of the light beams irradiated from said each light source are aligned in a time zone in which the image signal is not input.

Effects of the Invention

The effects obtained by typical embodiments of the invention disclosed in the present application will be briefly described below.

In the light beam scanning image projection apparatus according to the present invention, it is possible to automatically prevent the deterioration in the quality of the projected image due to the replacement of the light source and others.

BEST MODE FOR CARRYING OUT THE INVENTION

Hereinafter, embodiments of the present invention will be described in detail with reference to the accompanying drawings.

Note that components having the same function are denoted by the same reference symbols throughout the drawings for describing the embodiments, and the repetitive description thereof will be omitted.

First Embodiment

Figure 1:
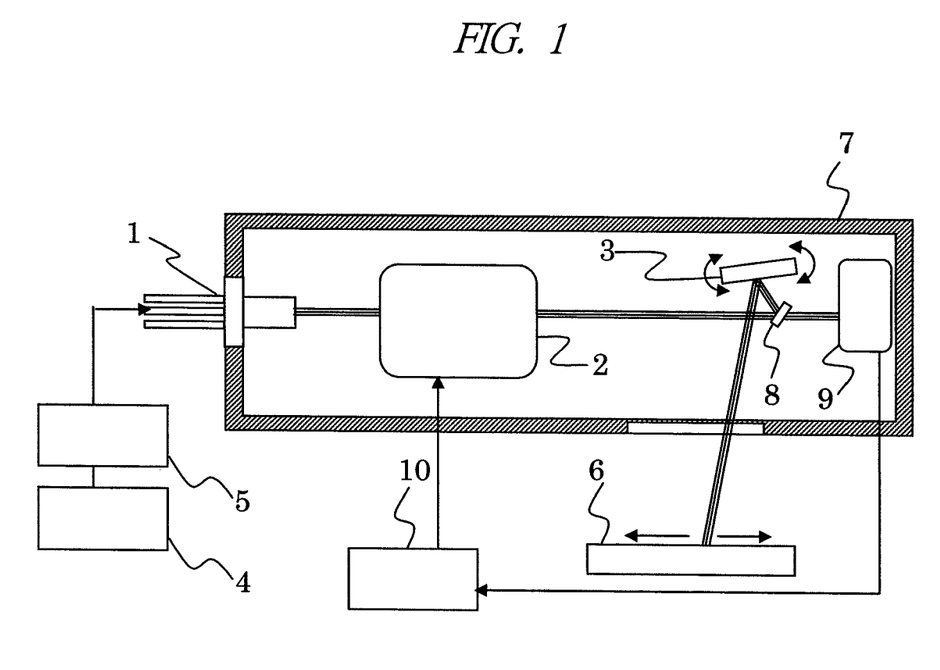
FIG. 1 is a cross-sectional view showing the principal part for describing the light beam scanning image projection apparatus according to the first embodiment of the present invention.

FIG. 1 is a cross-sectional view showing the principal part for describing the light beam scanning image projection apparatus according to the first embodiment of the present invention.

The light beam scanning image projection apparatus according to the present embodiment has a light source 1 which emits light beams of respectively different wavelengths, light axis alignment means 2 including a plurality of optical elements for almost aligning the light axes of the plural light beams, scanning means 3 for scanning the plural beams, transmitting means 4 for transmitting an image signal to a driving section of the light source 1, and a driving section 5 for modulating the intensity of the plural light beams in accordance with the image signal, and the light beams whose light axes are almost aligned are projected onto a screen 6.

At least one of the optical elements included in the light axis alignment means 2 is movable with respect to a chassis 7 holding the light source 1, and a part of the plural light beams is split by a beam splitter 8 and enters detecting means 9. For example, the detecting means 9 has a light receiving element capable of measuring the intensity of the light beam for each of the two right and left divided regions, and it can detect the shift between the spot center of each light beam and a center reference point.

Based on the detection result in the detecting means 9, a correction signal transmitting section 10 generates a correction signal for correcting the shift between the spot center of each light beam and the center reference point and transmits the correction signal to a position adjustment mechanism of the optical element of the light axis alignment means 2, which is movable with respect to the chassis 7, thereby aligning the light axes of each light beam.

For example, the light source 1 is a light emitting element which emits two types of lights such as a yellow light having a peak near the wavelength of 570 nm and a blue light having a peak at the wavelength of 460 nm.

Second Embodiment

Figure 2:
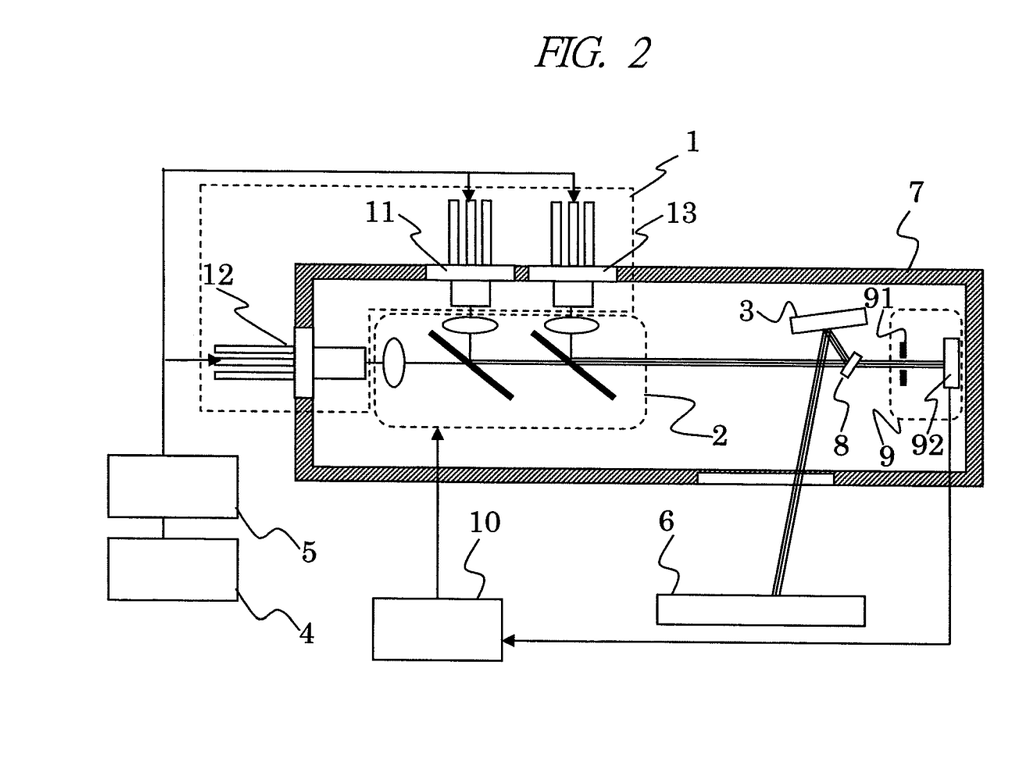
FIG. 2 is a cross-sectional view showing the principal part for describing the light beam scanning image projection apparatus according to the second embodiment of the present invention.
Figure 3:
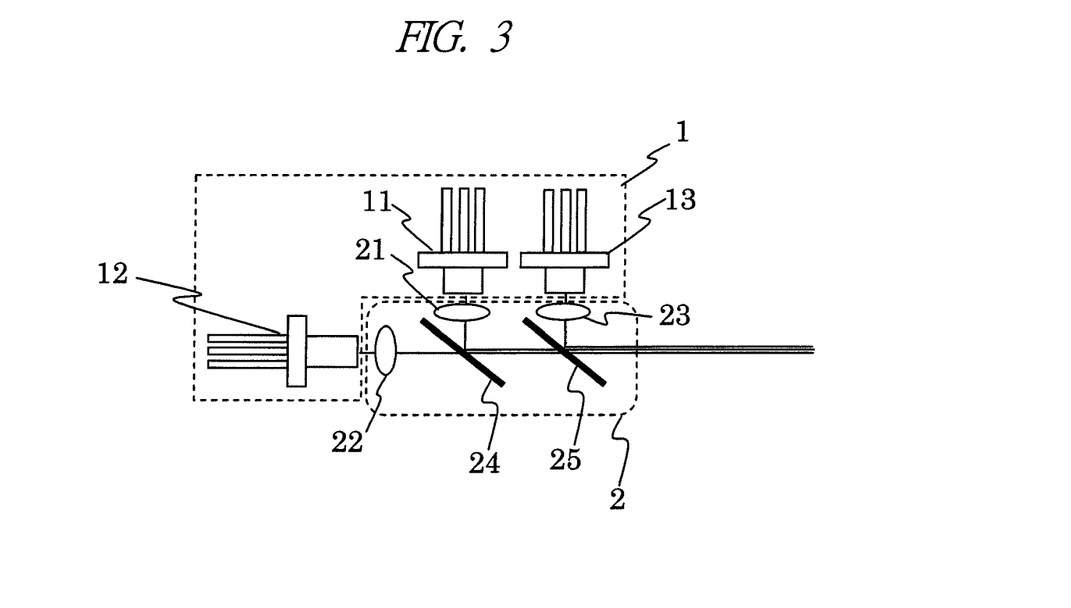
FIG. 3 is a cross-sectional view showing the principal part for describing the light axis alignment means shown in FIG. 2.

FIG. 2 is a cross-sectional view showing the principal part for describing the light beam scanning image projection apparatus according to the second embodiment of the present invention. FIG. 3 is a cross-sectional view showing the principal part for describing the light axis alignment means 2 shown in FIG. 2.

In the present embodiment, the light source 1 which emits light beams of respectively different wavelengths is made up of a red laser 11, a green laser 12 and a blue laser 13. As the wavelengths of each laser, the wavelength for red is selected from 600 nm to 700 nm, the wavelength for green is selected from 500 nm to 560 nm and the wavelength for blue is selected from 430 nm to 480 nm.

Here, it is desired that each laser can be directly modulated at 10 MHz or higher, more desirably at about 100 MHz. For example, a semiconductor laser of the oscillation wavelength of 642 nm can be selected for red, a semiconductor laser excitation solid-state laser of the oscillation wavelength of 532 nm can be selected for green, and a semiconductor laser of the oscillation wavelength of 450 nm can be selected for blue. A green semiconductor laser can be selected if it can be obtained.

Also, a light receiving element is provided for the lasers of respective wavelengths so that the optical output can be monitored from behind, and feedback is always given so that each optical output is controlled to a predetermined value specified by the image signal. Each of the lasers (11 to 13) is fixed to the chassis 7, but is fixed by screws so as to be replaced in the event of a fault.

As shown in FIG. 3, the light axis alignment means 2 including a plurality of optical elements is mainly made up of lenses (21 to 23) and beam splitters (24, 25) having a film made of a dielectric substance on the surface thereof. The beam sizes of the light beam of the red laser 11, the light beam of the green laser 12 and the light beam of the blue laser 13 are almost aligned within the range of 0.9 mm to 1.5 mm by the lens 21, the lens 22 and the lens 23, respectively, and these light beams are adjusted to be parallel lights. The parallel lights mentioned here are approximately represented by Gaussian beam and indicate the state where the spot diameter thereof is equal to or not more than twice the beam waist diameter within the region from each laser (11 to 13) to the screen 6.

The beam splitter 24 is designed to transmit 99.9% or more of the green light beam and reflect 97% or more of the red light beam. The beam splitter 25 is designed to transmit 99.9% or more of the red and green light beams and reflect 95% or more of the blue light beam.

The initial adjustment is made before the shipment by using these beam splitters (24, 25) so that the light axes of the red, green and blue light beams are aligned. Here, each of the lenses (21 to 23) is provided with an actuator so as to enable the later fine adjustment of the vertical gradient and the horizontal angle with respect to the light axis direction and the plane vertical to the light axis.

In the scanning means 3 for scanning the plural light beams, the mirror with the diameter of 1 to 3 mm can be modulated in biaxial directions by the MEMS, and the red, green and blue light beams being the parallel lights are reflected by the mirror.

By the transmitting means 4 for transmitting the image signal to the driving section of the red, green and blue lasers (11 to 13) and the driving section 5 which modulates the intensity of the light beams emitted from the red, green and blue lasers (11 to 13) in accordance with the image signal, the light beams which have the image information and whose light axes are almost aligned are projected onto the screen 6 to form one pixel, and the observer can recognize the whole of the two-dimensionally-scanned light beams as one image.

In the shipment, the light axes of the red, green and blue lasers (11 to 13) are aligned and each of the spots is adjusted to almost the same size. However, the lenses (21 to 23) included in the light axis alignment means 2 are movable with respect to the chassis 7 holding the light source 1.

This is because the shift of the light axis occurs when any of the lasers in the light source 1 is replaced or when the usage environment is changed and the light axes are adjusted and aligned later.

The adjustment before use is carried out in the following manner.

Figure 4:
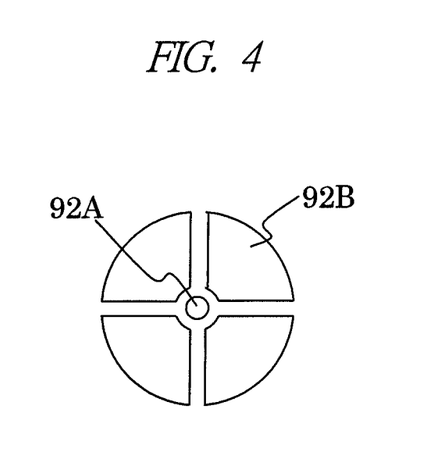
FIG. 4 is a diagram for describing the specific configuration of the light receiving element shown in FIG. 3.

That is, a part of the red, green and blue light beams, for example, about 0.5 to 2% is split by the beam splitter 8 and led to the detecting means 9. The detecting means 9 is made up of a pinhole 91 through which the light beam passes and a light receiving element 92. For example, the pinhole 91 has a circular aperture and the diameter thereof is set to 2 mm, and the light receiving element 92 is made up of four light receiving elements 92B which are disposed around a center reference point 92A and which the light transmitted through the pinhole 91 enters as shown in FIG. 4. Then, the intensity of the light beam is measured by the four light receiving elements 92B.

Note that there is no problem if at least two or more light receiving elements 92B are provided. The four light receiving elements 92B are made of the same material and are designed to generate the same optical current with respect to the light of the same optical output and output it as the same voltage.

In the adjustment before use, the red, green and blue light beams which penetrate through the pinhole 91 to have a circular shape are received by the four light receiving elements 92B one by one. Then, when the spot center of the light beam is shifted from the center reference point 92A, since the difference occurs in the output voltage of the four light receiving elements 92B, the correction signal to eliminate the voltage difference is generated in the correction signal transmitting section 10 to control the actuators provided for the lenses (21 to 23) of the light axis alignment means 2, thereby controlling the gradient of the lenses (21 to 23) so that the spot center of the light beam and the center reference point 92A are aligned with each other.

Also, the fluctuation of the beam diameter of the light beam can be detected by the difference in the amount of light received in the whole of the light receiving element 92. When the beam diameter of the light beam is too large, the amount of light beam penetrated through the pinhole 91 decreases, and the optical output becomes lower than the predetermined value. In such a case, a signal is transmitted to the actuators of the lenses (21 to 23) to control the focal position.

In the light beam scanning image projection apparatus according to the present embodiment, by setting the modulation rate of the MEMS to 30 KHz in the horizontal direction and to 60 Hz in the vertical direction, the two-dimensional image with the display resolution XGA can be displayed, and by the light axis adjustment before use, the spot diameter of the light beams of the red, green and blue lasers (11 to 13) can be always set to 1.5 mm or smaller and the shift of the spot center can be reduced to 0.5 mm or smaller on the screen 6 away from the present apparatus by 1 m.

Third Embodiment

Figure 5:
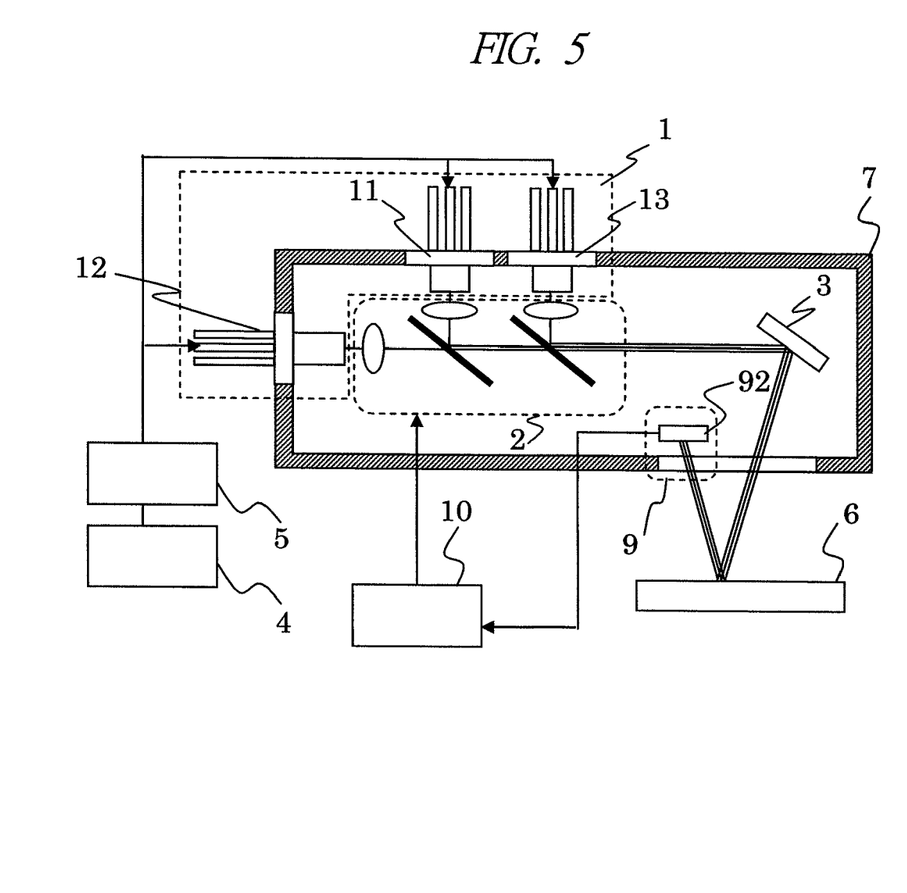
FIG. 5 is a cross-sectional view showing the principal part for describing the light beam scanning image projection apparatus according to the third embodiment of the present invention.

FIG. 5 is a cross-sectional view showing the principal part for describing the light beam scanning image projection apparatus according to the third embodiment of the present invention.

The mechanism for the image display is almost the same as that of the second embodiment.

The light source 1 which emits light beams of plural wavelengths is made up of the red laser 11, the green laser 12 and the blue laser 13. For example, a semiconductor laser of the oscillation wavelength of 630 nm can be selected for red, a semiconductor laser excitation solid-state laser of the oscillation wavelength of 520 nm can be selected for green, and a semiconductor laser of the oscillation wavelength of 460 nm can be selected for blue. Each of the lasers (11 to 13) is fixed to the chassis 7, but is fixed by screws so as to be replaced in the event of a fault.

As shown in FIG. 3, the light axis alignment means 2 including a plurality of optical elements is mainly made up of the lenses (21 to 23) and the beam splitters (24, 25) having a film made of a dielectric substance on the surface thereof. The beam sizes of the light beam of the red laser 11, the light beam of the green laser 12 and the light beam of the blue laser 13 are almost aligned within the range of 0.9 mm to 1.5 mm by the lens 21, the lens 22 and the lens 23, respectively, and these light beams are adjusted to be parallel lights.

The beam splitter 24 is designed to transmit 99.9% or more of the green light beam and reflect 97% or more of the red light beam, and it functions as a filter. The beam splitter 25 is designed to transmit 99.9% or more of the red and green light beams and reflect 95% or more of the blue light beam, and it functions as a filter.

The initial adjustment is made before the shipment by using these beam splitters (24, 25) so that the light axes of the red, green and blue beams are aligned.

Here, each of the lenses (21 to 23) is provided with an actuator so as to enable the later fine adjustment with respect to the light axis direction, and each of the beam splitters (24, 25) is provided with an actuator so as to enable the later fine adjustment of the vertical gradient and the horizontal angle with respect to the plane vertical to the light axis.

In the scanning means 3 for scanning the plural light beams, the mirror with the diameter of 2 mm can be modulated in biaxial directions by the MEMS, and the red, green and blue light beams being the parallel lights are reflected by the mirror.

By the transmitting means 4 for transmitting the image signal to the driving section of the red, green and blue lasers (11 to 13) and the driving section 5 which modulates the intensity of the light beams emitted from the red, green and blue lasers (11 to 13) in accordance with the image signal, the light beams which have the image information and whose light axes are almost aligned are projected onto the screen 6 to form one pixel, and the observer can recognize the whole of the two-dimensionally-scanned light beam as one image.

In the shipment, the light axes of the red, green and blue lasers (11 to 13) are aligned and each of the spots is adjusted to almost the same size. However, the lenses (21 to 23) and the beam splitters (24, 25) included in the light axis alignment means 2 are movable with respect to the chassis 7. This is because the shift of the light axis occurs when any of the lasers in the light source 1 is replaced or when the usage environment is changed and the light axes are adjusted and aligned later.

The adjustment before use is carried out in the following manner.

The red, green and blue lasers (11 to 13) are lit one by one and the light beams are projected onto the screen 6, and the reflected light thereof is led to the detecting means 9. The detecting means 9 is made up of the pinhole 91 through which the light beam passes and the light receiving element 92. For example, the pinhole 91 has a circular aperture and the diameter thereof is set to 2 mm, and the light receiving element 92 is made up of the four light receiving elements 92B which are disposed around the center reference point 92A and which the light transmitted through the pinhole 91 enters as shown in FIG. 4.

Then, the intensity of the light beam is measured by the four light receiving elements 92B. Note that there is no problem if at least two or more light receiving elements 92B are provided. The four light receiving elements 92B are made of the same material and are designed to generate the same optical current with respect to the light of the same optical output and output it as the same voltage.

In the adjustment before use, the red, green and blue light beams which penetrate through the pinhole 91 to have a circular shape are received by the four light receiving elements 92B one by one. When the spot center of the light beam is shifted from the center reference point 92A, since the difference occurs in the output voltage of the four light receiving elements 92B, the correction signal to eliminate the voltage difference is generated in the correction signal transmitting section 10 to control the actuators provided for the lenses (21 to 23) and the beam splitters (24, 25) of the light axis alignment means 2, thereby controlling the position and the gradient of the lenses (21 to 23) and the beam splitters (24, 25) so that the spot center of the light beam and the center reference point 92A are aligned with each other.

In the light beam scanning image projection apparatus according to the present embodiment, by setting the modulation rate of the MEMS to 18 KHz in the horizontal direction and to 60 Hz in the vertical direction, the two-dimensional image with the display resolution VGA can be displayed, and by the light axis adjustment before use, the spot diameter of the light beams of the red, green and blue lasers (11 to 13) can be always set to 1.2 mm or smaller and the shift of the spot center can be reduced to 0.3 mm or smaller on the screen away from the present apparatus by 50 cm.

Fourth Embodiment

Figure 6:
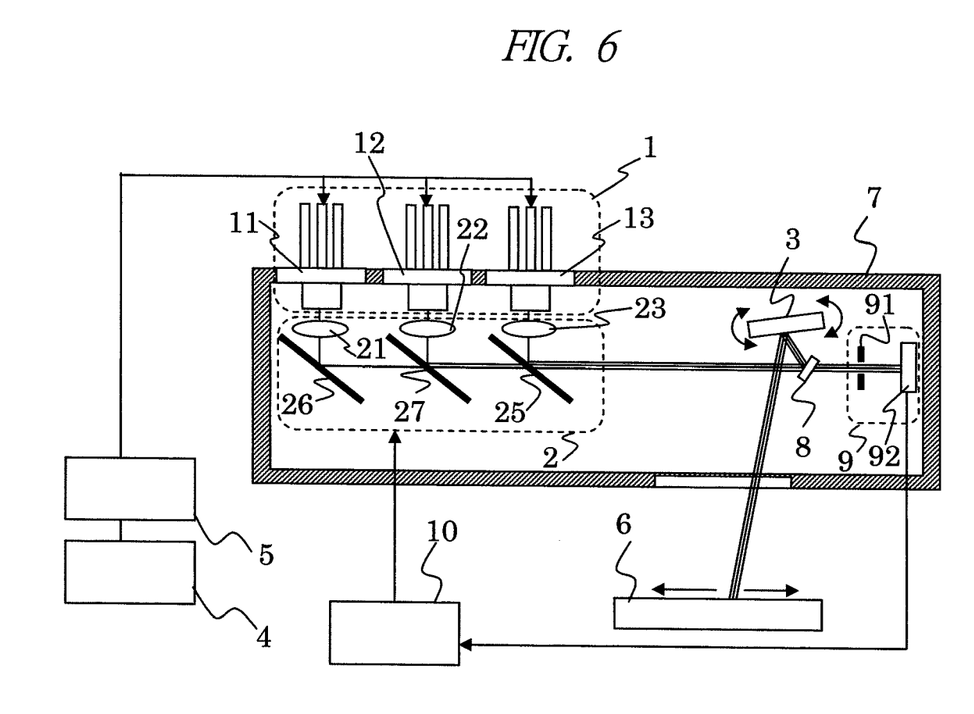
FIG. 6 is a cross-sectional view showing the principal part for describing the light beam scanning image projection apparatus according to the fourth embodiment of the present invention.

FIG. 6 is a cross-sectional view showing the principal part for describing the light beam scanning image projection apparatus according to the fourth embodiment of the present invention.

The light source 1 which emits light beams of respectively different wavelengths is made up of the red laser 11, the green laser 12 and the blue laser 13. For example, all of the lasers may be the semiconductor laser excitation solid-state lasers. The solid-state laser is made up of an infrared semiconductor laser for excitation, a nonlinear optical crystal capable of generating a second high-frequency wave by the photoexcitation, and a mirror or a diffraction grating which forms a resonator. For example, the oscillation wavelength of 610 nm can be selected for red, the oscillation wavelength of 532 nm can be selected for green, and the oscillation wavelength of 455 nm can be selected for blue. Each of the lasers (11 to 13) is fixed to the chassis 7.

The light axis alignment means 2 including a plurality of optical elements is mainly made up of the lenses (21 to 23), a mirror 26 and the beam splitters (25, 27). The beam sizes of the light beam of the red laser 11, the light beam of the green laser 12 and the light beam of the blue laser 13 are almost aligned within the range of 0.5 mm to 1.5 mm by the lens 21, the lens 22 and the lens 23, respectively, and these light beams are adjusted to be parallel lights.

A dielectric film is attached to the mirror 26 so as to reflect 98% or more of the light in the visible light range. The beam splitter 27 is designed to transmit 99.9% or more of the red light beam and reflect 97% or more of the green light beam, and it functions as a filter.

The beam splitter 25 is designed to transmit 99.9% or more of the red light beam and the green light beam and reflect 95% or more of the blue light beam, and it functions as a filter.

The initial adjustment is made before the shipment by using these mirror 26 and beam splitters (25, 27) so that the light axes of the red, green and blue lasers (11 to 13) are aligned.

Here, each of the lenses (21 to 23) is provided with an actuator so as to enable the later fine adjustment of the vertical gradient and the horizontal angle with respect to the light axis direction and the plane vertical to the light axis.

The mechanism for displaying the image and the mechanism for almost aligning the light axes and the beam diameters of the light beams of respective wavelengths as the adjustment before use are the same as those of the above-described second embodiment.

In the light beam scanning image projection apparatus according to the present embodiment, by setting the modulation rate of the MEMS to 18 KHz in the horizontal direction and to 60 Hz in the vertical direction, the two-dimensional image with the display resolution VGA can be displayed, and by the light axis adjustment before use, the spot diameter of the light beams of the red, green and blue lasers (11 to 13) can be always set to 1.2 mm or smaller and the shift of the spot center can be reduced to 0.2 mm or smaller on the screen away from the present apparatus by 50 cm.

Fifth Embodiment

Figure 7:
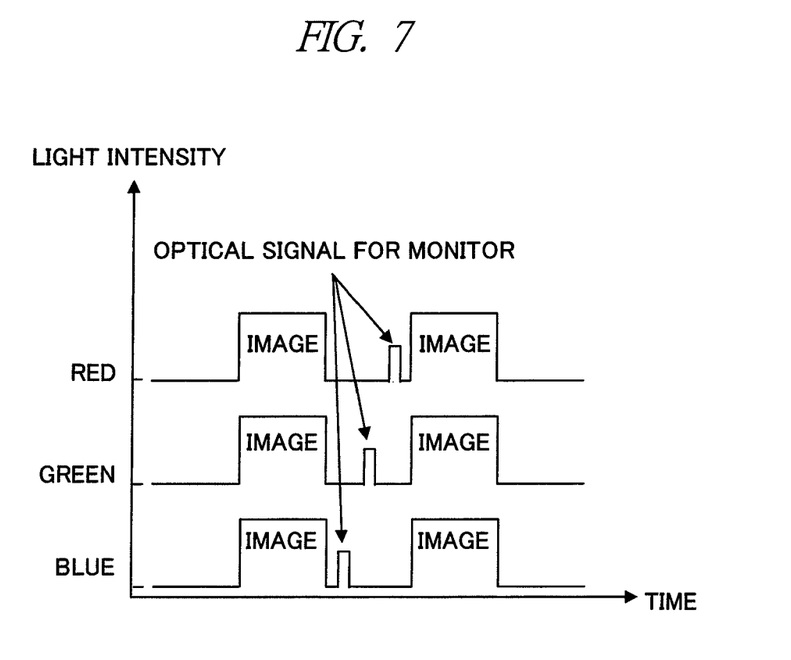
FIG. 7 is a timing chart in the case where the light beam adjustment mechanism of the light beam scanning image projection apparatus according to each embodiment of the present invention is operated not only before use but also during the image display.

As the fifth embodiment of the present invention, FIG. 7 shows the timing in the case where the light beam adjustment mechanism of the light beam scanning image projection apparatus is operated not only before use but also during the image display.

The configuration of the apparatus may be the same as that of the second embodiment shown in FIG. 2.

The red, green and blue light beams are intensity-modulated at 10 MHz, and the light intensity is higher than 0 when the beam has the information of the image signal at the display timing of the pixel and the light intensity is 0 in the other cases.

The lights of each wavelength are sequentially emitted only for 10 to 15 ns at the timing between the image displays and are transmitted through the beam splitter 8, and then led to the detecting means 9. The light receiving element 92 of the detecting means 9 is made up of the four light receiving elements 92B, and each of the four light receiving elements 92B has a shape of a quarter circle with a radius of about 0.3 to 0.6 mm. If the size is larger than that, the light receiving element cannot respond to the short-time light emission of 10 ns order of the light emitting element, and if too smaller, the light receiving element becomes smaller in size than the beam diameter and the adjustment accuracy is lowered.

When the spot center of the light beam is shifted from the center reference point 92A, since the difference occurs in the output voltage of the four light receiving elements 92B, the correction signal to eliminate the voltage difference is generated in the correction signal transmitting section 10 to control the actuators provided for the lenses (21 to 23) of the light axis alignment means 2, thereby controlling the position and the gradient of the lenses (21 to 23) so that the light beams of respective colors have almost the same diameter and the spot center of the light beam and the center reference point 92A are aligned with each other.

In the light beam scanning image projection apparatus according to the present embodiment, by setting the modulation rate of the MEMS to 18 KHz in the horizontal direction and to 60 Hz in the vertical direction, the two-dimensional image with the display resolution VGA can be displayed, and by the light axis adjustment before use, the spot diameter of the light beams of the red, green and blue lasers (11 to 13) can be always set to 1.2 mm or smaller and the shift of the spot center can be reduced to 0.2 mm or smaller on the screen away from the present apparatus by 30 cm.

In the foregoing, the invention made by the inventors of the present invention has been concretely described based on the embodiments. However, it is needless to say that the present invention is not limited to the foregoing embodiments and various modifications and alterations can be made within the scope of the present invention.

The invention claimed is:

1. A light beam scanning image projection apparatus comprising:
   a plurality of light sources which emit light beams of respectively different wavelengths;
   a driving section which modulates an intensity of said each light beam in accordance with an image signal;
   a light axis alignment device which aligns light axes of said each light beam; and
   a scanning device which scans said each light beam,
   wherein the light axis alignment device includes:
   a plurality of optical elements; and
   an adjusting section which adjusts at least one of a position and a gradient of at least one of the optical elements, and
   the light beam scanning image projection apparatus further comprises:
   a detecting device which detects a shift between a spot center of said each light beam and a center reference point; and
   a position correction device which controls the adjusting section based on a detection result in the detecting device to adjust at least one of the position and the gradient of at least one of the optical elements of the light axis alignment device, thereby aligning the light axes of said each light beam,
   wherein said light axis alignment device has an optical system which collects the plurality of light beams generated from said each light source at one axis,
   said optical system includes at least a lens, and
   said position correction device controls said adjusting section to change a position and a gradient of at least the lens of the optical system, thereby adjusting a propagation direction of said each light beam.

2. The light beam scanning image projection apparatus according to claim 1,
   wherein said plurality of light sources include semiconductor lasers which emit blue, green and red light beams or a solid-state laser which emits a light beam of second high-frequency wave excited by a semiconductor laser.

3. The light beam scanning image projection apparatus according to claim 1,
   wherein said position correction device adjusts a propagation direction of said each light beam based on the detection result in the detecting device.

4. The light beam scanning image projection apparatus according to claim 1,
   wherein the detecting device includes:
   a pinhole; and
   a plurality of light receiving elements which are disposed around the center reference point and which a light penetrated through the pinhole enters, a light beam penetrated through a beam splitter out of the light beams emitted from said each light source enters the pinhole, and said position correction device controls said adjusting section based on an output signal from the plurality of light receiving elements to adjust at least one of the position and the gradient of at least one of the optical elements of the light axis alignment device, thereby aligning the light axes of said each light beam.

5. The light beam scanning image projection apparatus according to claim 4,
wherein the position correction device adjusts a beam diameter of said each light beam based on the output signal of the plurality of optical elements.

6. The light beam scanning image projection apparatus according to claim 4,
wherein the light axes of the light beams irradiated from said each light source are aligned in a time zone in which the image signal is not input.

7. A light beam scanning image projection apparatus comprising:
a plurality of light sources which emit light beams of respectively different wavelengths;
a driving section which modulates an intensity of said each light beam in accordance with an image signal;
a light axis alignment device which aligns light axes of said each light beam; and
a scanning device which scans said each light beam,
wherein the light axis alignment device includes:
a plurality of optical elements; and
an adjusting section which adjusts at least one of a position and a gradient of at least one of the optical elements, and
the light beam scanning image projection apparatus further comprises:

a detecting device which detects a shift between a spot center of said each light beam and a center reference point; and
a position correction device which controls the adjusting section based on a detection result in the detecting device to adjust at least one of the position and the gradient of at least one of the optical elements of the light axis alignment device, thereby aligning the light axes of said each light beam, wherein the detecting device includes:
a pinhole; and
a plurality of light receiving elements which are disposed around the center reference point and which a light penetrated through the pinhole enters,
a reflected light from a projection plane of the light beam emitted from said each light source enters the pinhole, and
said position correction device controls said adjusting section based on an output signal from the plurality of light receiving elements to adjust at least one of the position and the gradient of at least one of the optical elements of the light axis alignment device, thereby aligning the light axes of said each light beam.

8. The light beam scanning image projection apparatus according to claim 7,
wherein the position correction device adjusts a beam diameter of said each light beam based on the output signal of the plurality of optical elements.

9. The light beam scanning image projection apparatus according to claim 7,
wherein the light axes of the light beams irradiated from said each light source are aligned in a time zone in which the image signal is not input.

* * * * *